US010486710B2

(12) United States Patent
Ishiguro et al.

(10) Patent No.: US 10,486,710 B2
(45) Date of Patent: Nov. 26, 2019

(54) CRUISE CONTROL DEVICE AND CRUISE CONTROL METHOD

(71) Applicant: ISUZU MOTORS LIMITED, Tokyo (JP)

(72) Inventors: Shinichi Ishiguro, Kawasaki (JP); Ryuu Yamakado, Fujisawa (JP); Kazutaka Shimoda, Kawasaki (JP)

(73) Assignee: ISUZU MOTORS LIMITED, Tokyo (JP)

(*) Notice: Subject to any disclaimer, the term of this patent is extended or adjusted under 35 U.S.C. 154(b) by 134 days.

(21) Appl. No.: 15/559,179

(22) PCT Filed: Mar. 17, 2016

(86) PCT No.: PCT/JP2016/058521
§ 371 (c)(1),
(2) Date: Sep. 18, 2017

(87) PCT Pub. No.: WO2016/152723
PCT Pub. Date: Sep. 29, 2016

(65) Prior Publication Data
US 2018/0072322 A1 Mar. 15, 2018

(30) Foreign Application Priority Data
Mar. 26, 2015 (JP) ................... 2015-064242

(51) Int. Cl.
*B60W 40/10* (2012.01)
*B60W 30/14* (2006.01)
(Continued)

(52) U.S. Cl.
CPC ...... *B60W 40/1005* (2013.01); *B60W 30/143* (2013.01); *B60W 30/18072* (2013.01);
(Continued)

(58) Field of Classification Search
CPC .......... B60W 30/143; B60W 40/1005; B60W 50/0097; B60W 30/18072;
(Continued)

(56) References Cited

U.S. PATENT DOCUMENTS 5,507,705 A * 4/1996 Hara ................ B60W 10/06
477/108
9,849,880 B2 * 12/2017 D'Amato ............ B60W 30/143
(Continued)

FOREIGN PATENT DOCUMENTS

DE 102011119008 * 5/2013
DE 102011119008 A1 5/2013
(Continued)

OTHER PUBLICATIONS

International Search Report from International Application No. PCT/JP2016/058521 dated May 31, 2016.
(Continued)

*Primary Examiner* — Mussa A Shaawat
(74) *Attorney, Agent, or Firm* — Brundidge & Stanger, P.C.

(57) ABSTRACT

This cruise control device enables more accurate prediction of running resistance and prevents worsening of fuel economy. In this device, a coasting prediction unit (12c) of an automatic cruise control device (12), which is for performing cruise control of the vehicle (1) on the basis of a resistance coefficient, predicts, on the basis of the resistance coefficient, the change in vehicle speed if the vehicle (1) were to coast; if the vehicle (1) does coast, a vehicle information acquisition unit (12b) acquires information about the detected vehicle speed; and a running resistance updating unit (12f) updates the value of the resistance coefficient on the basis of the information about the change in vehicle speed predicted by the coasting prediction unit
(Continued)

(12c) and information about the vehicle speed acquired by the vehicle information acquisition unit (12b).

6 Claims, 3 Drawing Sheets

(51) Int. Cl.
*B60W 30/18* (2012.01)
*B60W 50/00* (2006.01)

(52) U.S. Cl.
CPC ..... *B60W 50/0097* (2013.01); *B60W 2520/10* (2013.01); *B60W 2530/10* (2013.01); *B60W 2530/16* (2013.01); *B60W 2540/10* (2013.01); *B60W 2540/12* (2013.01); *B60W 2540/16* (2013.01); *B60W 2550/142* (2013.01); *B60W 2550/146* (2013.01); *B60W 2550/402* (2013.01); *B60W 2720/10* (2013.01); *Y02T 10/52* (2013.01); *Y02T 10/76* (2013.01); *Y02T 10/84* (2013.01)

(58) Field of Classification Search
CPC ......... B60W 2520/10; B60W 2530/16; B60W 2550/142; Y02T 10/84; Y02T 10/52; Y02T 10/76
See application file for complete search history.

(56) References Cited

U.S. PATENT DOCUMENTS

| | | | | |
|---|---|---|---|---|
| 2010/0248896 | A1* | 9/2010 | Dreier | F16H 61/0213 477/118 |
| 2011/0015037 | A1* | 1/2011 | Koenig | B60W 10/115 477/121 |
| 2011/0251763 | A1* | 10/2011 | Roth | B60W 40/1005 701/51 |
| 2012/0197500 | A1* | 8/2012 | Sujan | B60W 50/0097 701/51 |
| 2013/0103238 | A1* | 4/2013 | Yu | G06F 17/00 701/22 |
| 2013/0116903 | A1* | 5/2013 | Lenz | G06F 17/00 701/68 |
| 2013/0345902 | A1* | 12/2013 | Papajewski | B60W 40/1005 701/1 |
| 2015/0224867 | A1* | 8/2015 | Nett | B60K 1/00 180/65.25 |
| 2015/0224992 | A1* | 8/2015 | Dornieden | B60W 30/143 701/1 |
| 2015/0291161 | A1* | 10/2015 | Amano | B60K 31/00 701/93 |
| 2015/0329119 | A1* | 11/2015 | Sujan | F02D 41/08 701/54 |
| 2016/0016564 | A1 | 1/2016 | Otake et al. | |
| 2016/0019792 | A1 | 1/2016 | Kawamata et al. | |
| 2016/0257288 | A1* | 9/2016 | Miller | B60T 1/10 |
| 2017/0322907 | A1* | 11/2017 | McQuade | F02D 29/02 |
| 2017/0329742 | A1* | 11/2017 | McQuade | F02D 29/02 |

FOREIGN PATENT DOCUMENTS

| | | |
|---|---|---|
| DE | 102012200085 A1 | 7/2013 |
| DE | 102012014468 A1 | 5/2014 |
| JP | 2000-033827 A | 2/2000 |
| JP | 2000-219059 A | 8/2000 |
| JP | 2007-196704 A | 8/2007 |
| JP | 2010-023803 A | 2/2010 |
| JP | 2012-131273 A | 7/2012 |
| JP | 2013-169956 A | 9/2013 |
| JP | 2013-248998 A | 12/2013 |
| WO | 2014/162522 A1 | 10/2014 |

OTHER PUBLICATIONS

Extended European Search Report dated Apr. 26, 2018 for European Patent Application No. 16768626.0.

* cited by examiner

CRUISE CONTROL DEVICE AND CRUISE CONTROL METHOD

TECHNICAL FIELD

The present invention relates to a travel control device and a travel control method.

BACKGROUND ART

Conventionally, auto-cruising techniques to reduce the driver's fatigue, improve the riding comfort, and improve the fuel economy by maintaining the speed of a vehicle such as an automobile at a setting speed are known.

For example, PTL 1 discloses a hybrid electric vehicle control device that performs the above-mentioned speed control. This control device performs the control such that, in the case where a vehicle travels on an upslope, coasting is started from a point before the crest such that the speed at the crest point has an acceptable lower limit value to reduce the fuel consumption amount. In addition, PTL 1 includes a disclosure in which an energy loss such as a roll resistance is taken into consideration when a control device calculates the above-mentioned point.

CITATION LIST

Patent Literature

PTL 1
Japanese Patent Application Laid-Open No. 2012-131273

SUMMARY OF INVENTION

Technical Problem

However, in the conventional technique, a resistance coefficient such as a roll resistance coefficient is a fixed value in the estimation of the value of a travel resistance such as a roll resistance generated during the travel of the vehicle, and consequently there is a possibility that the estimation cannot be accurately performed.

For example, when the actual travel resistance at the time when the vehicle performs coasting at a point before the crest of the upslope is greater than the estimated value, the dropping amount of the vehicle speed during the coasting is greater than the estimated dropping amount. As a result, reacceleration in the course of the upslope becomes necessary, and consequently the fuel economy is degraded.

To solve the above-mentioned problems, an object of the present invention is to provide a travel control device and a travel control method which can more accurately estimate the travel resistance, and can prevent degradation of fuel economy.

Solution to Problem

To solve the above-mentioned problems, a travel control device of an embodiment of the present invention controls travel of a vehicle based on a resistance coefficient, the travel control device including: a coasting estimation section that estimates based on the resistance coefficient a variation of a vehicle speed of a case where the vehicle performs coasting; a vehicle information acquiring section that acquires information about a vehicle speed detected in the case where the vehicle performs coasting; and a travel resistance updating section that updates a value of the resistance coefficient based on information about the variation of the vehicle speed estimated by the coasting estimation section, and the information about the vehicle speed acquired by the vehicle information acquiring section.

A travel control method of an embodiment the present invention is a method for performing a travel control of a vehicle based on a resistance coefficient, the method including: estimating based on the resistance coefficient a variation of a vehicle speed of a case where the vehicle performs coasting; acquiring information about a vehicle speed detected in the case where the vehicle performs coasting; and updating a value of the resistance coefficient based on information about the variation of the vehicle speed estimated by the estimating, and the information about the vehicle speed acquired by the acquiring.

Advantageous Effects of Invention

According to the present invention, it is possible to more accurately estimate the travel resistance, and prevent degradation of fuel economy.

DESCRIPTION OF EMBODIMENTS

Figure 1:
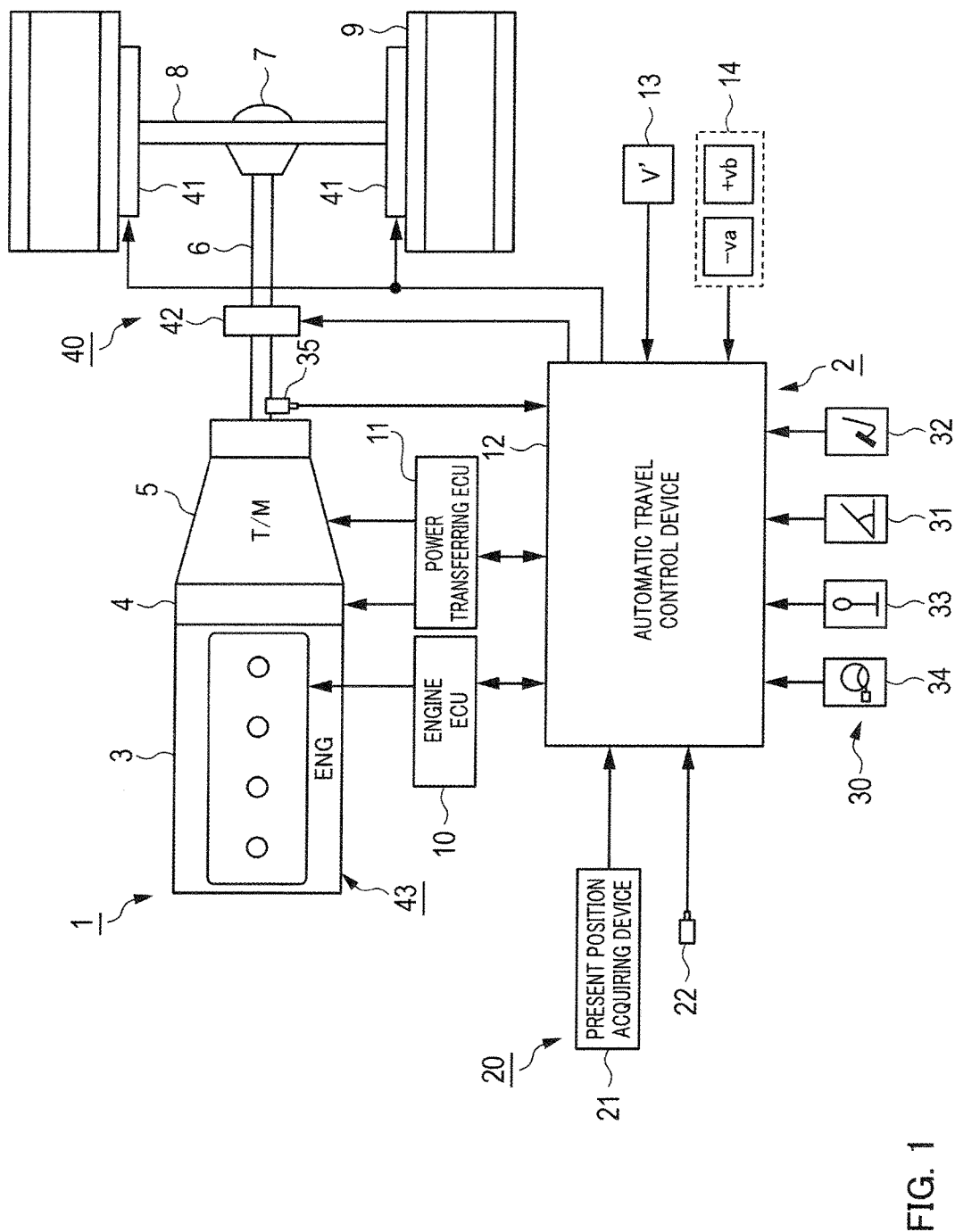
FIG. 1 is a block diagram illustrating an example configuration of an automatic travel device according to an embodiment of the present invention.
Figure 2:
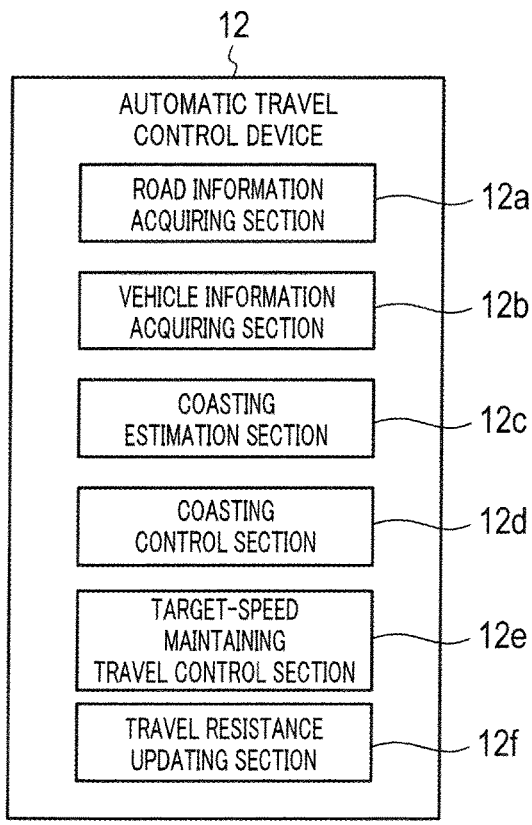
FIG. 2 is a block diagram illustrating an example configuration of an automatic travel control device illustrated in FIG. 1.

An embodiment of the present invention is described below with reference to the accompanying drawings. FIG. 1 is a block diagram illustrating an example configuration of automatic travel device 2 according to the embodiment of the present invention. In addition, FIG. 2 is a block diagram illustrating an example configuration of automatic travel control device 12 illustrated in FIG. 1.

It is to be noted that, while engine 3 is an in-line six-cylinder diesel engine in FIG. 1, the present invention is applicable also to a gasoline engine, and the arrangement and the number of the cylinders are not limited. In addition, while vehicle 1 is a large vehicle such as a truck in which a diesel engine is mounted in the following description, the present invention is not limited to large vehicles such as trucks. In addition, the coasting means coasting with the gear of transmission 5 in the neutral position.

As illustrated in FIG. 1, in vehicle 1 in which automatic travel device 2 of the present embodiment is mounted, the power of engine 3 is transmitted to transmission 5 via clutch 4, and transmitted from transmission 5 to differential gear 7 through a propeller shaft 6, and further, transmitted from differential gear 7 to wheel 9 through drive shaft 8. In this manner, the power of engine 3 is transmitted to wheel 9, and thus vehicle 1 travels.

Automatic travel device 2 of the present embodiment controls the output of engine 3, the connection and disconnection of clutch 4, and the transmission of transmission 5 for the automatic travel of vehicle 1. Automatic travel device 2 includes a plurality of control devices.

To be more specific, automatic travel device 2 includes control engine ECU (engine control unit) 10 that controls the output of engine 3, power transferring ECU (power transferring control unit) 11 that controls the connection and disconnection of clutch 4 and the transmission of transmission 5, and automatic travel control device 12 that controls the automatic travel of vehicle 1.

Each of engine ECU 10, power transferring ECU 11, and automatic travel control device 12 is composed of a micro controller. Engine ECU 10, power transferring ECU 11, and automatic travel control device 12 are connected with one another with an in-vehicle network, and required data and control signals are exchanged therebetween.

In addition, automatic travel device 2 includes, at a dashboard of a driver's seat not illustrated, target-vehicle speed setting device 13 and increment/reduction value setting device 14, and target-vehicle speed setting device 13 and increment/reduction value setting device 14 are connected with automatic travel control device 12.

Target-vehicle speed setting device 13 is a device that is manually operated by the driver before the automatic travel of vehicle 1 is started, to set target-vehicle speed V' [km/h] of vehicle 1 in the automatic travel. When target-vehicle speed V' is set in target-vehicle speed setting device 13 by the driver, the target-vehicle speed V' is transmitted to automatic travel control device 12, and stored in a storage device of automatic travel control device 12.

Increment/reduction value setting device 14 is a device that is operated by the driver before the automatic travel of vehicle 1 is started and after target-vehicle speed V' is set, to set both speed reduction value −va [km/h] and speed increment value +vb [km/h] of vehicle 1 in the automatic travel.

When both speed reduction value −va and speed increment value +vb are set in increment/reduction value setting device 14 by the driver, speed reduction value −va and speed increment value +vb are transmitted to automatic travel control device 12, and stored in a storage device of automatic travel control device 12.

In addition, automatic travel control device 12 adds speed reduction value −va and speed increment value +vb to target-vehicle speed V' to calculate lower limit target-vehicle speed Va' [km/h] and upper limit target-vehicle speed Vb' [km/h], and stores the calculated values in the storage device of automatic travel control device 12.

For example, in the case where target-vehicle speed V' is 80 km/h, speed reduction value −va is −5 km/h, and speed increment value +vb is +10 km/h, lower limit target-vehicle speed Va' is 75 km/h and upper limit target-vehicle speed Vb' is 90 km/h. It is to be noted that speed reduction value −va and speed increment value +vb may be set to zero.

Lower limit target-vehicle speed Va' and upper limit target-vehicle speed Vb' define a range of vehicle speed V [km/h] which can be accepted by the driver in the automatic travel of vehicle 1.

In addition, road information acquiring device 20 is a device for acquiring road information about the road ahead. The road ahead is the road extending from the present position of the vehicle in the travelling direction of the vehicle.

For example, road information acquiring device 20 includes present position acquiring device 21 that is a receiver of a global positioning system (GPS), and periphery sensor 22 that detects the distance from vehicles around the travelling vehicle such as a vehicle travelling ahead and/or a vehicle travelling on a side, and the difference in vehicle speed from other vehicles around the travelling vehicle.

Vehicle information acquiring device 30 is a device for acquiring vehicle information of vehicle 1. For example, vehicle information acquiring device 30 includes accelerator sensor 31 that detects the pressing amount of the accelerator pedal, brake switch 32 that detects the presence/absence of the pressing of the brake pedal, shift lever 33, turn-signal switch 34, and vehicle speed sensor 35 that detects vehicle speed V of vehicle 1. In addition, engine ECU 10 and power transferring ECU 11 are also included in vehicle information acquiring device 30.

As illustrated in FIG. 2, automatic travel control device 12 includes road information acquiring section 12a, vehicle information acquiring section 12b, coasting estimation section 12c, coasting control section 12d, target-speed maintaining travel control section 12e, and travel resistance updating section 12f.

Road information acquiring section 12a determines the road ahead, and acquires road information required for the automatic travel of vehicle 1 on the road ahead.

To be more specific, road information acquiring section 12a determines the road ahead based on the present position acquired by present position acquiring device 21, map data stored in advance and the like, and acquires information about the road grade of the acquired road ahead, the curve of the road ahead, the presence/absence of traffic lights and the like. In addition, road information acquiring section 12a acquires information about the distance and the difference in vehicle speed from other travelling vehicles around the vehicle and the like, which is detected by periphery sensor 22.

Vehicle information acquiring section 12b acquires vehicle information required for the automatic travel of vehicle 1.

To be more specific, vehicle information acquiring section 12b acquires information about the pressing amount of the accelerator pedal detected by accelerator sensor 31, the presence/absence of the pressing of the brake pedal detected by brake switch 32, the operation of shift lever 33 and/or turn-signal switch 34, vehicle speed V of vehicle 1 detected by vehicle speed sensor 35, the output of engine 3 used in engine ECU 10 and power transferring ECU 11, the weight of vehicle 1, the transmission gear of transmission 5 and the like.

It is to be noted that the information acquired by road information acquiring section 12a and vehicle information acquiring section 12b is not limited to the above-mentioned information, and other information required for the automatic travel of vehicle 1 may be acquired. In addition, the devices provided in road information acquiring device 20 and/or vehicle information acquiring device 30 may be changed or additionally provided in accordance with the information to be acquired.

On the basis of the road information and the vehicle information, coasting estimation section 12c determines whether the estimated vehicle speed of the case where vehicle 1 performs coasting in a predetermined section of the road ahead falls within the range between lower limit target vehicle speed Va' and upper limit target vehicle speed Vb'.

When coasting estimation section 12c determines that the estimated vehicle speed falls within the range between lower limit target vehicle speed Va' and upper limit target vehicle speed Vb', coasting control section 12d controls vehicle 1 on the road ahead to perform coasting by stopping the fuel injection of engine 3. This control is carried out by sending to engine ECU 10 a request for stopping the fuel injection of engine 3.

When coasting estimation section 12c determines that the estimated vehicle speed does not fall within the range between lower limit target vehicle speed Va' and upper limit target vehicle speed Vb', target-speed maintaining travel control section 12e controls vehicle 1 on the road ahead to perform a target-speed maintaining travelling to change vehicle speed V toward target vehicle speed V'.

In addition, when vehicle speed V of vehicle 1 performing coasting does not fall within the range between lower limit target vehicle speed Va' and upper limit target vehicle speed Vb', target-speed maintaining travel control section 12e controls vehicle 1 on the road ahead to perform a target-speed maintaining travelling to change vehicle speed V toward target vehicle speed V'.

To be more specific, when it is determined that the estimated vehicle speed is lower than lower limit target vehicle speed Va', or when vehicle speed V during the coasting is lower than lower limit target vehicle speed Va', target-speed maintaining travel control section 12e requests engine ECU 10 to start the fuel injection of engine 3, and requests power transferring ECU 11 to set the gear of transmission 5 to a predetermined gear.

The output of engine 3 is thus transmitted to wheel 9 to increase vehicle speed V toward target vehicle speed V'.

When it is determined that the estimated vehicle speed is higher than upper limit target vehicle speed Vb', or when vehicle speed V during the coasting is higher than upper limit target vehicle speed Vb', target-speed maintaining travel control section 12e controls braking device 40 to apply a braking force to vehicle 1 to change vehicle speed V toward target vehicle speed V' while maintaining the coasting.

It is to be noted that braking device 40 includes foot brake 41, retarder 42, and auxiliary brake 43 such as an exhaust brake that is controlled with engine ECU 10 and/or power transferring ECU 11.

Travel resistance updating section 12f updates the value of the resistance coefficient based on information about the variation in the vehicle speed during the coasting acquired by vehicle information acquiring section 12b, and information about the variation in the vehicle speed during the coasting estimated by coasting estimation section 12c. The value of the resistance coefficient is used for estimation of the vehicle speed by coasting estimation section 12c, and the like.

Figure 3:
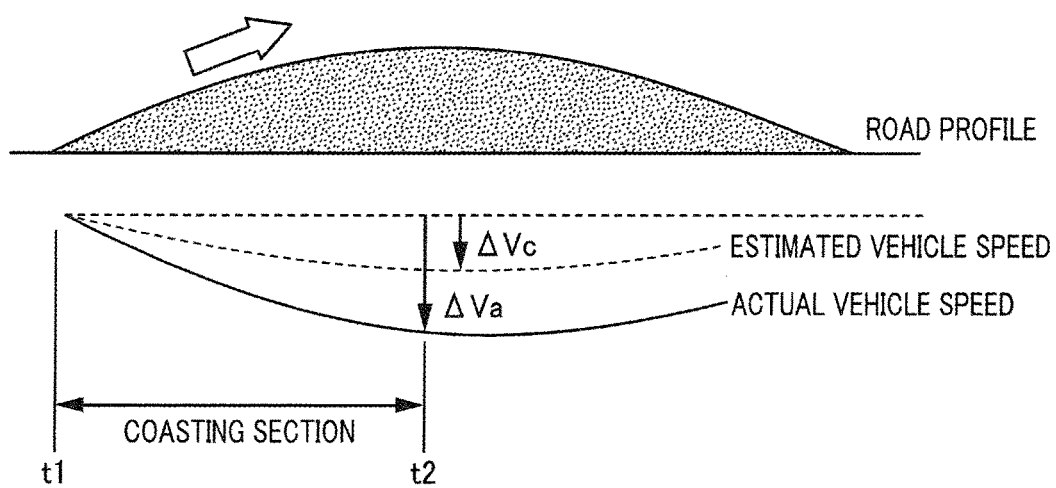
FIG. 3 illustrates vehicle speed variations $\Delta Vc$ and $\Delta Va$.

A method of updating the resistance coefficient is described below with reference to FIG. 3. FIG. 3 illustrates vehicle speed variations ΔVc [km/h] and ΔVa [km/h].

When a deceleration during the coasting is expressed as dV/dt [km/h2] using time t[h], the relationship between the deceleration and travel resistance value RR is expressed by Expression (1).

[Expression 1]

$$\frac{dV}{dt} = (\theta - RR)g \tag{1}$$

Here, θ represents the road grade of the road ahead, and the sign of θ is minus in the case of an upslope and is plus in the case of a downslope. As described above, θ is obtained from the map data. The g [km/h2] represents the gravitational acceleration.

In addition, travel resistance value RR is expressed by Expression (2).

[Expression 2]

$$RR = (m \times RRC + ARC \times V^2)/m \tag{2}$$

Here, m [kg] represents the vehicle weight, RRC the roll resistance coefficient, and ARC [kgf/(km/h)²] the air resistance coefficient, and these values are set in advance. It is to be noted that the initial speed of a coasting section is used for speed V in Expression (2).

Next, when an estimated vehicle speed variation of a section ahead is represented by ΔVc (see FIG. 3), and vehicle speed variation ΔVc is caused at time Δt[h] (Δt=t2−t1, see FIG. 3), vehicle speed variation ΔVc is expressed as Expression (3) by use of Expression (1).

[Expression 3]

$$\Delta Vc = \frac{dV}{dt} \cdot \Delta t = (\theta - RR) \cdot \Delta t \tag{3}$$

In addition, when an actual vehicle speed variation is represented by ΔVa (see FIG. 3), and an actual value of the travel resistance is represented by RRa, vehicle speed variation ΔVa is expressed as Expression (4) by use of Expression (1).

[Expression 4]

$$\Delta Va = (\theta - RRa)g \cdot \Delta t \tag{4}$$

Here, Δt in Expression (3) and Expression (4) is obtained by approximately dividing section length L by section initial speed V. In this case, Expression (5) is obtained from Expression (3) and Expression (4).

[Expression 5]

$$\frac{\Delta Va}{\Delta Vc} = \frac{\theta - RRa}{\theta - RR} \tag{5}$$

Then, Expression (6) is obtained by dividing the both sides of Expression (5) by travel resistance value RR and by organizing the expression for ratio RRa/RR.

[Expression 6]

$$\frac{RRa}{RR} = \frac{\theta}{RR} \cdot \left(1 - \frac{\Delta Va}{\Delta Vc}\right) + \frac{\Delta Va}{\Delta Vc} \tag{6}$$

In Expression (6), road grade θ of the road ahead is known, travel resistance value RR can be calculated from Expression (2), and ratio ΔVa/ΔVc can be obtained by dividing the actual vehicle speed variation by the estimated value of the vehicle speed variation, and therefore, the value of ratio RRa/RR can be calculated.

Travel resistance updating section 12f calculates ratio ΔVa/ΔVc for each coasting, and, when ratio ΔVa/ΔVc falls outside a predetermined range, calculates ratio RRa/RR by use of Expression (6).

Then, travel resistance updating section 12f multiplies each of roll resistance coefficient RRC and air resistance coefficient ARC by the ratio of RRa/RR, and newly sets the resulting values as values of roll resistance coefficient RRC and air resistance coefficient ARC to thereby update the values of roll resistance coefficient RRC and air resistance coefficient ARC. With this configuration, the subsequent estimation of the travel resistance can be accurately performed.

Figure 4:
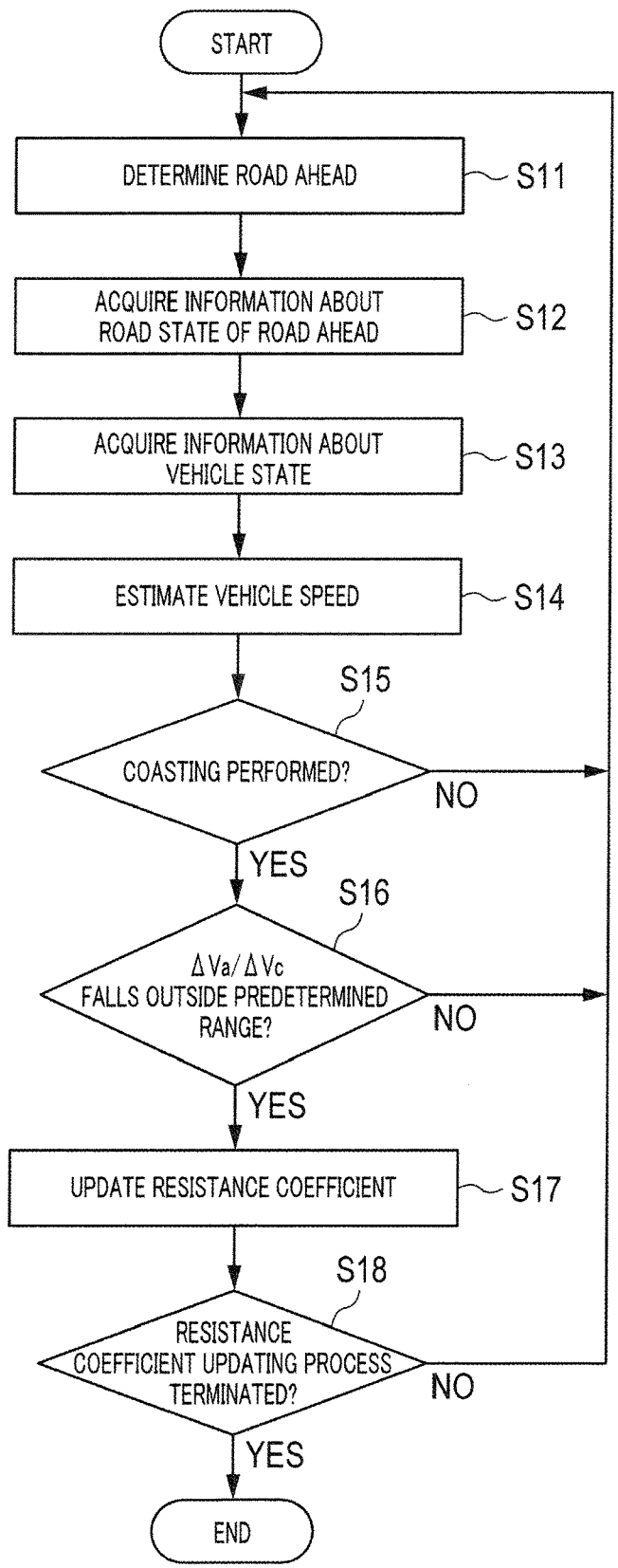
FIG. 4 is a flowchart of an example process of a resistance coefficient updating process according to the embodiment of the present invention.

Next, an example process of a resistance coefficient updating process according to the embodiment of the present invention is described. FIG. 4 is a flowchart of an example process of the resistance coefficient updating process according to the embodiment of the present invention.

First, road information acquiring section 12a determines the road ahead (step S11), and acquires road information about the road ahead (step S12). Then, vehicle information acquiring section 12b acquires information about the vehicle state (step S13).

Subsequently, coasting estimation section 12c estimates the vehicle speed of vehicle 1 of the case where coasting is performed by use of the acquired information (step S14).

Thereafter, travel resistance updating section 12f determines whether vehicle 1 has performed coasting (step S15). When travel resistance updating section 12f determines that vehicle 1 has not performed coasting (NO at step S15), the processes subsequent to step S11 are again performed.

When vehicle 1 has performed coasting (YES at step S15), travel resistance updating section 12f determines whether ratio ΔVa/ΔVc calculated in the above-mentioned manner falls outside a predetermined range (step S16).

When ratio ΔVa/ΔVc does not fall outside the predetermined range (NO at step S16), the processes subsequent to step S11 are again performed.

When ratio ΔVa/ΔVc falls outside the predetermined range (YES at step S16), travel resistance updating section 12f updates the resistance coefficient in the above-mentioned manner (step S17).

Thereafter, travel resistance updating section 12f determines whether to complete this resistance coefficient updating process (step S18). For example, travel resistance updating section 12f determines that this resistance coefficient updating process is to be completed when the driver has requested completion of the automatic travel.

When travel resistance updating section 12f determines that the resistance coefficient updating process is to be terminated (YES at step S18), travel resistance updating section 12f terminates the resistance coefficient updating process. In addition, when travel resistance updating section 12f determines that the resistance coefficient updating process is not to be completed (NO at step S18), the processes subsequent to step S11 are again performed.

While travel resistance updating section 12f updates the value of the resistance coefficient when the coasting is performed and ratio ΔVa/ΔVc falls outside a predetermined range in the above-mentioned case, travel resistance updating section 12f may update the value of the resistance coefficient for each coasting.

In addition, while ratio ΔVa/ΔVc is a parameter that is used for the determination whether the accuracy of the estimation of the vehicle speed is lowered, the parameter used for the determination is not limited to ratio ΔVa/ΔVc, and other parameters may be used for the determination.

For example, travel resistance updating section 12f may determine that the accuracy of the estimation of the vehicle speed is lowered and update the value of the resistance coefficient when the absolute value of difference Δ0 ΔVc falls outside a predetermined range.

As described above, according to the present embodiment, in travel control device 12 that controls travel of a vehicle based on a resistance coefficient, coasting estimation section 12c estimates based on the resistance coefficient a variation of a vehicle speed of a case where the vehicle performs coasting; vehicle information acquiring section 12b acquires information about a vehicle speed detected in the case where the vehicle performs coasting; and travel resistance updating section 12f updates a value of the resistance coefficient based on information about the variation of the vehicle speed estimated by coasting estimation section 12c, and the information about the vehicle speed acquired by vehicle information acquiring section 12b. With this configuration, the accuracy of the estimation of the travel resistance can be increased, and degradation of fuel economy can be prevented.

In addition, according to the present embodiment, travel resistance updating section 12f updates the value of the resistance coefficient for each coasting. With this configuration, estimation of the travel resistance can be performed by use of the latest resistance coefficient at all times.

In addition, according to the present embodiment, travel resistance updating section 12f updates the value of the resistance coefficient when it is determined that coasting is performed and estimation of the vehicle speed accuracy is lowered. With this configuration, it is possible to efficiently update the resistance coefficient and perform estimation of the travel resistance.

In addition, according to the present embodiment, travel resistance updating section 12f updates the value of the resistance coefficient based on the ratio of the variation of the estimated vehicle speed and the variation of the detected vehicle speed, the grade of the road ahead, and the value of the travel resistance estimated based on the resistance coefficient. With this configuration, the travel resistance can be more correctly calculated.

In addition, according to the present embodiment, the resistance coefficient is the roll resistance coefficient and the air resistance coefficient. With this configuration, the roll resistance coefficient and the air resistance coefficient are updated to more correct values, and thus the travel resistance can be more correctly calculated.

This application is entitled to and claims the benefit of Japanese Patent Application No. 2015-064242 dated Mar. 26, 2015, the disclosure of which including the specification, drawings and abstract is incorporated herein by reference in its entirety.

INDUSTRIAL APPLICABILITY

The present invention is applicable to a travel control device, and a travel control method for controlling the vehicle travel based on the resistance coefficient.

REFERENCE SIGNS LIST

1 Vehicle
2 Automatic travel device
3 Engine
4 Clutch
5 Transmission
10 Engine ECU (engine control unit)
11 Power transferring ECU (power transferring control unit)
12 Automatic travel control device
12a Road information acquiring section
12b Vehicle information acquiring section
12c Coasting estimation section
12d Coasting control section
12e Target-speed maintaining travel control section
12f Travel resistance updating section
13 Target-vehicle speed setting device
14 Increment/reduction value setting device 20 Road information acquiring device
30 Vehicle information acquiring device
40 Braking device

The invention claimed is:

1. A travel control device operable to control a travel of a vehicle based on a roll resistance coefficient and an air resistance coefficient, the travel control device comprising:
a coasting estimation section operable to estimate, based on the roll resistance coefficient and the air resistance coefficient, an estimated vehicle speed variation in a case where the vehicle performs coasting;
a vehicle information acquiring section operable to acquire an actual vehicle speed variation detected in the case where the vehicle performs coasting; and
a travel resistance updating section operable to update a value of the roll resistance coefficient and a value of the air resistance coefficient based on both a first ratio and a second ratio,
the first ratio being a ratio of the actual vehicle speed variation to the estimated vehicle speed, and
the second ration being a ratio of a grade of a road ahead of the vehicle to a travel resistance calculated based on the roll resistance coefficient and the air resistance coefficient.

2. The travel control device according to claim 1, wherein the travel resistance updating section is further operable to update the value of the roll resistance coefficient and the value of the air resistance coefficient for each instance of coasting.

3. The travel control device according to claim 1, wherein the travel resistance updating section is further operable to update the value of the roll resistance coefficient and the value of the air resistance coefficient when it is determined that the coasting is performed and that an accuracy of estimation of the vehicle speed is lowered.

4. A travel control method for performing a travel control of a vehicle based on a roll resistance coefficient and an air resistance coefficient, the method comprising:
estimating, based on the roll resistance coefficient and the air resistance coefficient, an estimated vehicle speed variation in a case where the vehicle performs coasting;
acquiring an actual vehicle speed variation detected in the case where the vehicle performs coasting; and
updating a value of the roll resistance coefficient and a value of the air resistance coefficient based on both a first ratio and a second ratio,
the first ratio being a ratio of the actual vehicle speed variation to the estimated vehicle speed variation to the actual vehicle speed variation, and
the second ratio being a ratio of a grade of a road ahead of the vehicle to a travel resistance calculated based on the roll resistance coefficient and the air resistance coefficient.

5. The travel control device according to claim 1, wherein the value of the roll resistance coefficient and the value of the air resistance coefficient is updated by multiplying each of the value of the roll resistance coefficient and the value of the air resistance coefficient by the ratio of the first ratio and the second ratio.

6. The travel control method according to claim 4, wherein the value of the roll resistance coefficient and the value of the air resistance coefficient is updated by multiplying each of the value of the roll resistance coefficient and the value of the air resistance coefficient by the ratio of the first ratio and the second ratio.

* * * * *